(12) United States Patent
Egigian

(10) Patent No.: US 7,481,610 B1
(45) Date of Patent: Jan. 27, 2009

(54) TIE-DOWN ASSEMBLY

(76) Inventor: Donald S. Egigian, 6 Emmy La., Ladera Ranch, CA (US) 92694

( * ) Notice: Subject to any disclaimer, the term of this patent is extended or adjusted under 35 U.S.C. 154(b) by 0 days.

(21) Appl. No.: 11/965,117

(22) Filed: Dec. 27, 2007

(51) Int. Cl.
*B60P 7/08* (2006.01)
(52) U.S. Cl. ........................................ 410/106; 410/110
(58) Field of Classification Search ................. 410/101, 410/106, 110, 116; 24/265 CD, 115 K; 248/499
See application file for complete search history.

(56) References Cited

U.S. PATENT DOCUMENTS

| | | | |
|---|---|---|---|
| 3,259,353 A | 7/1966 | Webb | |
| 3,298,652 A | 1/1967 | Burdick | |
| 3,351,356 A | 11/1967 | Clark et al. | |
| 3,421,726 A | 1/1969 | Getter | |
| 3,595,125 A | 7/1971 | Jacobs | |
| 3,841,660 A | 10/1974 | Clark | |
| 3,950,010 A | 4/1976 | Robertson | |
| 4,191,108 A | 3/1980 | Jones | |
| 4,607,991 A | 8/1986 | Porter | |
| 5,141,277 A | 8/1992 | Alexander | |
| 5,326,203 A | 7/1994 | Cockrell | |
| 5,676,508 A * | 10/1997 | Weicht | 410/101 |
| 6,969,219 B2 | 11/2005 | Speece et al. | |

* cited by examiner

*Primary Examiner*—Stephen Gordon
(74) *Attorney, Agent, or Firm*—Gene Scott; Patent Law & Venture Group

(57) ABSTRACT

A tie-down assembly is engaged within a truck side wall pocket to enable attachment of ropes, cables, bungee cords and the like. A body has an open ring formation and a bottom surface with an indented cavity and a mounting hole extending therethrough. A mount has a flange laying in contact with the outside surface of the truck side wall, and further has a bottom panel having an upwardly extending ridge which extends into the indented cavity of the body. A clamp includes a clamp plate with legs in contact with the inside surface of the truck side wall. The clamp has a fastener receiver engaging a fastener extending through the body and the mount, and which can be adjusted to provide clamping forces through the legs and flange on opposing sides of the truck side wall to secure the assembly to the side wall.

8 Claims, 3 Drawing Sheets

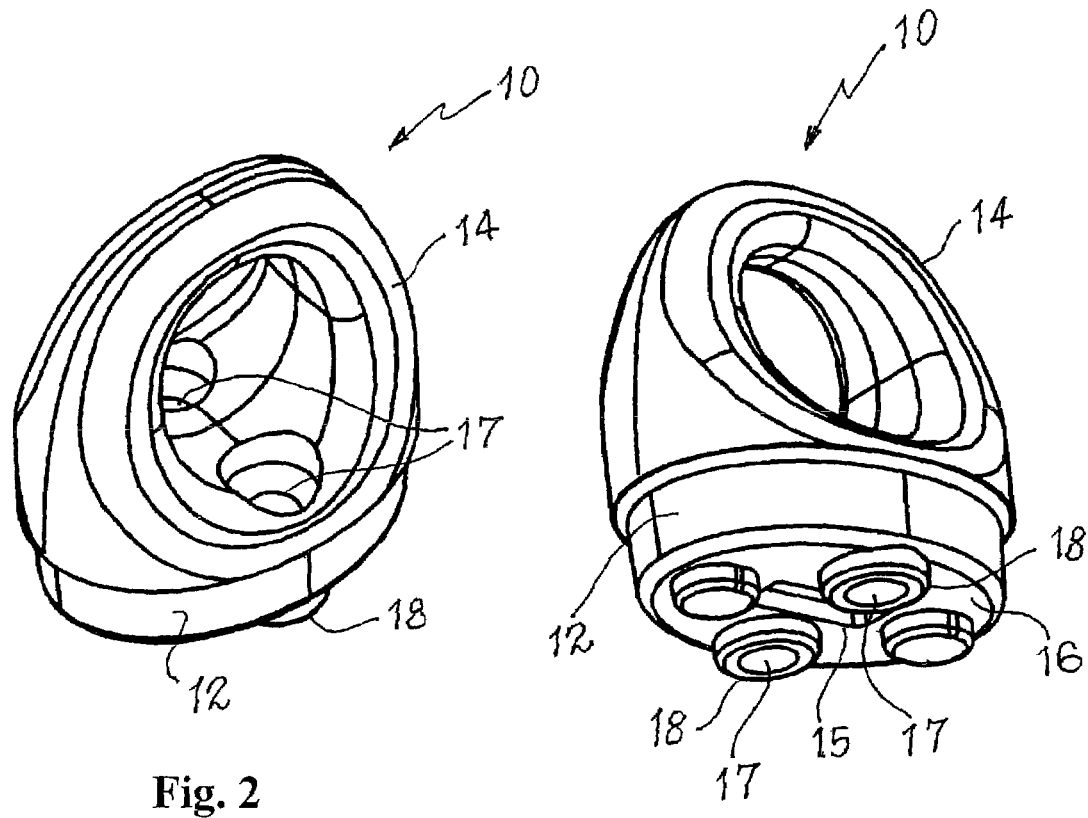
Fig. 2
Fig. 3
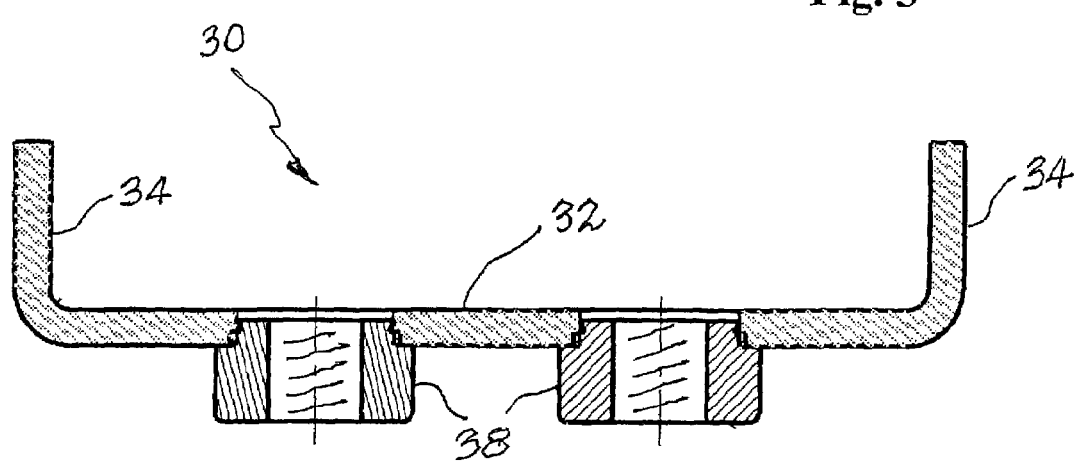
Fig. 4

TIE-DOWN ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISK

Not applicable.

REFERENCE TO A "MICROFICHE APPENDIX"

Not applicable.

SEQUENCE LISTING

Not applicable.

BACKGROUND OF THE INVENTION

1. Field of the Present Disclosure

This present invention relates to tie-down strap anchor assemblies which enable tie-down straps to be securely anchored to vehicle stake pockets for securing cargo such as tool boxes and similar items within a cargo portion of a truck or other vehicle.

2. Description of Related Art Including Information Disclosed Under 37 CFR 1.97 and 1.98

The cargo bed portions of many vehicle bodies, such as pick-up trucks, are typically provided with four to more stake pockets in the double walled sidewalls of the vehicle body on either side of the cargo bed. These stake pockets typically have generally rectangular shaped openings in the upper horizontally extending wall portions of the sidewalls that extend between the inner and outer double walls of the sidewalls. The stake pockets extend down into the sidewalls and are normally used to receive and retain upright stakes along either side of the cargo bed of the vehicle to help contain cargo, that extends above the sidewalls on either side of the cargo bed, within the cargo bed portion of the vehicle.

In the past there have been many attempts to provide stake pocket anchors that can be used to anchor tie-down straps, ropes, etc. to the stake pockets of pick-up trucks and other trucks or trailers for the purpose of containing cargo within the cargo bed portion of the vehicle. For example, U.S. Pat. No. 3,259,353, issued Jul. 5, 1966, discloses a rope hook, with a spring loaded anchor, that extends out through the opening of a stake pocket to receive a rope for securing cargo; U.S. Pat. No. 3,298,652, issued Jan. 17, 1967, discloses a hook mounting that is secured to a stake pocket by nut and bolt assemblies; U.S. Pat. No. 3,351,356, issued Nov. 7, 1967, discloses a tie-down device with a hook that is secured to the sidewall of the pick-up truck with a threaded fastener and extends above the sidewall of the pick-up truck; U.S. Pat. No. 3,421,726, issued Jan. 14, 1969, discloses a tie-down anchor device with a hook that is secured within a stake pocket by a pair of wedge members and extends above the sidewall of the pick-up truck; U.S. Pat. No. 3,595,125, issued Jul. 27, 1971, discloses a tie-down device with a ring that is secured to a stake pocket by wedged apart strap members and extends above the sidewall of the pick-up truck; U.S. Pat. No. 3,841,660, issued Oct. 15, 1974, discloses a pick-up truck rail assembly and tie-down device that is secured to the stake pockets by threaded mechanical fasteners; U.S. Pat. No. 3,950,010, issued Apr. 13, 1976, discloses a tie-down clamp assembly for a truck vehicle bed which includes a hook that is secured to a stake pocket by threaded mechanical fasteners and extends above the sidewall of the pick-up truck; U.S. Pat. No. 4,191,108, issued Mar. 4, 1980, discloses a tie-down anchor with a ring that is secured to a stake pocket opening by stop legs and projections and extends above the sidewall of the pick-up truck; U.S. Pat. No. 4,607,991, issued Aug. 26, 1986, discloses a tie-down anchor for a truck bed with a ring that is secured to a stake pocket pivoted, spring loaded arms and extends above the sidewall of the pick-up truck; U.S. Pat. No. 5,141,277, issued Aug. 25, 1992, discloses a stake pocket insert with a bolt for a tie down anchor that protrudes from the stake pocket and includes a U-shaped clamp bracket; U.S. Pat. No. 5,326,203, issued Jul. 5, 1994, discloses a stake pocket anchor, secured to a stake pocket with threaded mechanical fasteners, that has a threaded hole therein for receiving an eye bolt, and U.S. Pat. No. 6,969,219, issued Nov. 29, 2005, discloses a cargo anchor with a cover plate having a peripheral edge extensive for covering a panel aperture in the up-facing surface of a side wall of a truck. An anchor bar for securing an anchor line is engaged with the cover plate. A locator plate is fastened to the cover plate with screws and is positioned with a well associated with the panel aperture. The locator plate engages a flange tube within the truck sidewall, limiting movement of the cargo anchor so that a space between the panel aperture and the peripheral edge of the cover plate cannot occur.

While all of these devices can be used as tie-down strap anchors, there has remained a need to provide a low cost, easy to install, tie-down strap anchor that: provides a very secure anchor for a tie-down stream as for, but not limited to, placement in camper shells on the cargo bed portion of a pick-up truck and similar applications, and which can be made inexpensively.

BRIEF SUMMARY OF THE INVENTION

This disclosure teaches certain benefits in construction and use which give rise to the objectives described below.

The present invention is a tie-down assembly for engagement within a truck stake pocket to enable attachment of straps, ropes, cables, bungee cords and the like for securing cargo in the bed of the truck. The assembly includes a body has an open ring formation and a bottom surface with an indented cavity. Mounting holes extending through the body. A mount is placed on the top surface of stake pocket and received the body inserting a ridge into the cavity of the body. A clamp is placed below the mount with its legs in contact with the pocket's sheet metal. Screw fasteners extend through the body and the mount into nuts secured in the clamp and are tightened so that the mount and the clamp are tightly clamped on opposing sides of the pocket's adjacent sheet metal.

A primary objective inherent in the above described apparatus and method of use is to provide advantages not taught by the prior art.

Another objective is to provide a cargo strap anchorage that is capable of receiving high lateral loading.

A further objective is to provide such an anchorage that is inexpensively manufactured.

A further objective is to provide such an anchorage that is able to clamp onto the sides of a sheet metal aperture.

A further objective is to provide such an anchorage that is easily engaged and disengaged with the sheet metal aperture.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIG. 2 is a perspective view of a body thereof as seen from above;

FIG. 3 is a perspective view of the body thereof as seen from below;

FIG. 4 is a side elevational view of a clamp thereof; and

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 5:
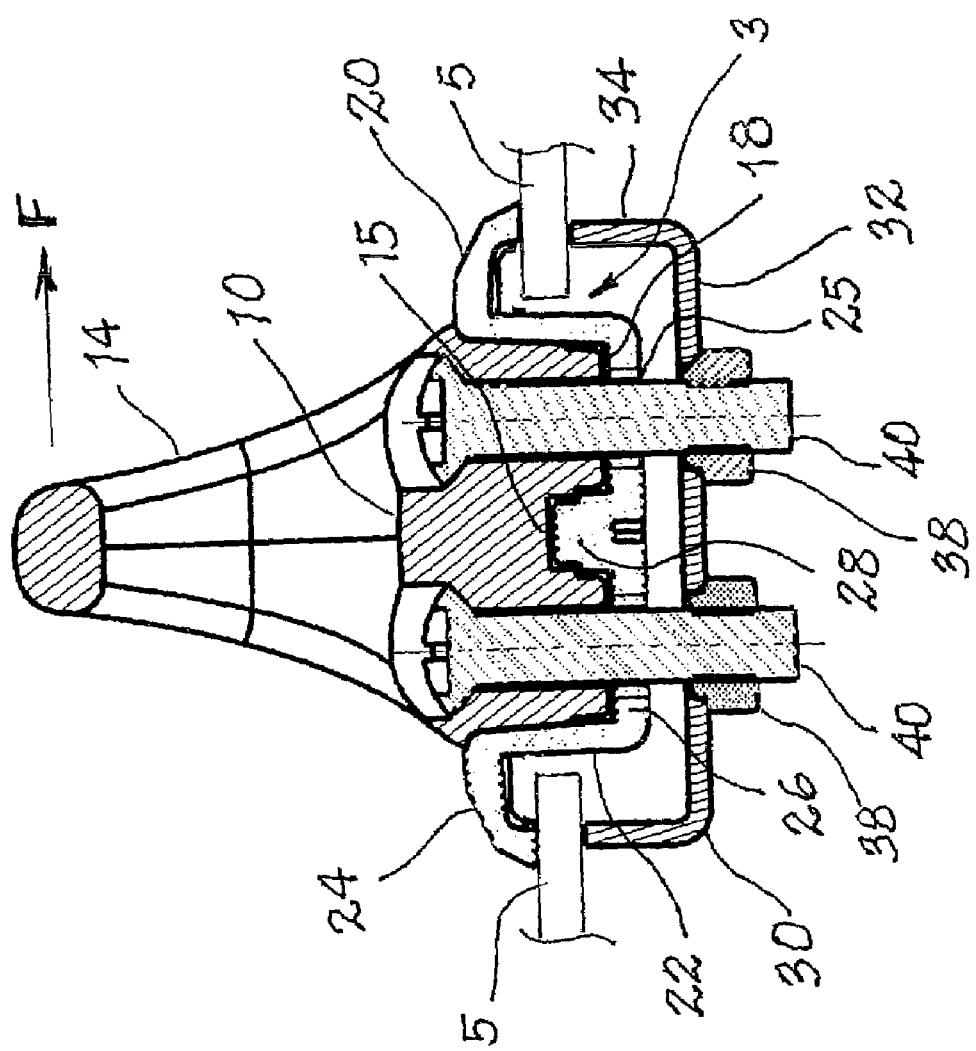
FIG. 5 is a vertical sectional view thereof as taken along cutting plane line 5-5 in FIG. 1 and showing the relationships between the several parts of the apparatus and the means for mounting in a sheet metal aperture.

Described now in detail is a tie-down assembly. As shown in FIG. 5, the assembly is preferably mounted within an aperture 3 prepared in a sheet metal surface 5 such as on the top surface of a side rail of a panel truck or other vehicle. The assembly is made up of three separate parts which are held together by fasteners, as will be described. The three parts are: a body 10, a mount 20, and a clamp 30, as shown in FIG. 1 in spaced apart perspective.

The body 10 is preferably formed as a plastic or metal molded part and has a vertical first peripheral side wall 12 extending upwardly as an open ring formation 14. The side wall 12 terminates downwardly at a bottom surface 16 (FIG. 3) having a pair of bosses 18 protruding therefrom (FIG. 3). The surface 16 also provides an indented cavity 15 which extends upwardly in the body 10 as shown in FIG. 5, and a pair of vertical mounting holes 17 (FIGS. 2 and 3) which extend through the body 10 from inside the ring formation 14 (FIG. 2) to exit from the bosses 18 (FIG. 3).

Figure 1:
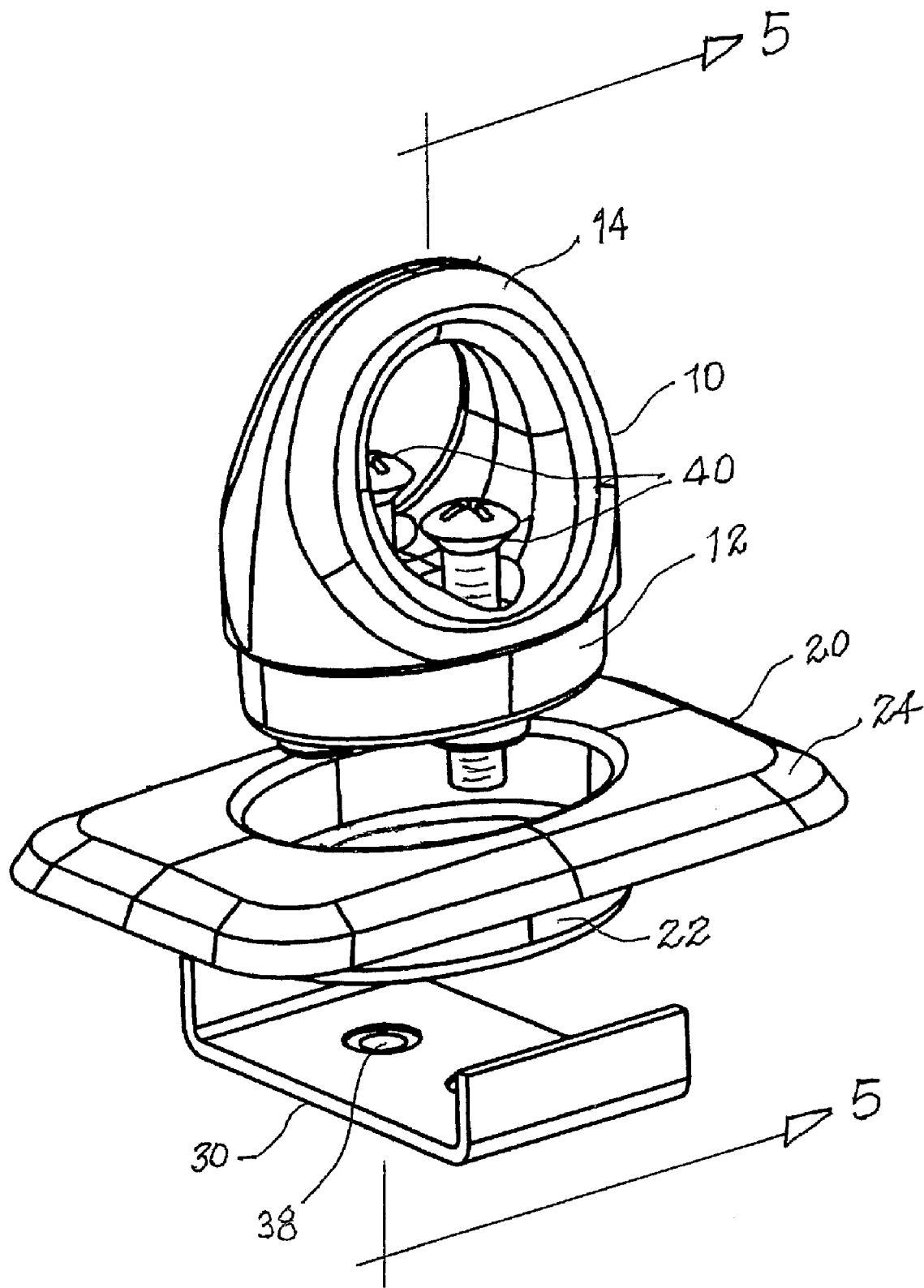
FIG. 1 is an exploded perspective view of the presently described apparatus.

The mount 20, as best seen in FIG. 1, is preferably formed as a plastic or metal molded part having a vertical second peripheral side wall 22 (FIG. 5), terminating upwardly with a peripheral horizontally extensive flange 24, and terminating downwardly as an integral bottom wall 26, which provides an upwardly extending ridge 28 sized for frictional engagement into the indented cavity 15 of the body 10. As shown in FIG. 5, two clearance holes 25 are provided in bottom wall 26 to enable fasteners 40 to pass through wall 26.

The clamp 30 is preferably fabricated from metal sheet stock. As shown in FIG. 1, a horizontal clamp plate 32 terminates at spaced apart upwardly extending vertical legs 34. The clamp plate 32 provides a fastener receiver such as nuts 38 which are secured to plate 32 by swaging engagement as is well known in the art. Fasteners 40, preferably machine screws, extend through mounting holes 17 in the body 10, and clearance holes 25 in the mount 20, to engaged nuts 38. Once mounted within aperture 3 and onto sheet stock 5 of the truck or other apparatus, fasteners 40 may be tightened to draw the vertical legs 34 of the clamp 30 toward the flange 24 of the mount 20, thereby establishing a clamped engagement between the tie-down assembly and the sheet stock 5 of the truck.

As shown in FIG. 5, both sidewalls 12 and 22 are downward convergent primarily for ease of removal from a mold cavity, however, also to provide an improved press fit between body 10 and mount 20. This is desirable since, in use, tie-down forces are generally applied to body 10 in the direction indicated by arrow "F" shown in FIG. 5, i.e., in a lateral direction. Notice that this places the fasteners 40 in shear stress as body 10 tends to strain to the right in FIG. 5, and also the leftmost one of the fasteners 40 shown in FIG. 5, is placed in tension as body 10 tends to rotate clockwise in FIG. 5. The convergent shape of sidewalls 12 and 22 help to transfer the shear and tension forces on fasteners 40 directly to mount 20 and thus to the sidewall 5. Of importance, the engagement of ridge 28 within indented cavity 15 helps to prevent rotation of body 10, and to transfer forces to sidewall 5 through mount 20. Finally, forces are transferred to sidewall 5 through clamp 30 as delivered by fasteners 40 and nuts 38.

In my previous patent U.S. Pat. No. 6,969,219, which is hereby incorporated by reference herein, I teach a tie-down device and its mounting in stake pockets on the tops of sidewalls of an open bed truck. The present invention may be advantageously mounted in a similar manner and the sidewall 5 of the present disclosure corresponds to bed sidewalls 14 of the '219 reference.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A tie-down assembly for a truck bed comprising: a body, a mount and a clamp; the body having a peripheral body side wall and, extending upwardly from the body side wall, an open ring formation; a bottom surface of the body defining an upwardly extensive indented cavity; the mount having an internal peripheral mount side wall, the mount side wall engaging the body side wall frictionally, the mount further having an upwardly protruding ridge, the ridge extending into and engaging the indented cavity; the clamp having a fastener receiver engaging a fastener extending through the body and the mount.

2. The tie-down assembly for a truck bed of claim 1 wherein the bottom surface has a downwardly extending boss formed thereon.

3. The tie-down assembly for a truck bed of claim 2 wherein the body defines a mounting hole therethrough, the mounting hole centered on the boss.

4. The tie-down assembly for a truck bed of claim 1 further comprising a mount flange peripheral about the mount side wall and extensive outwardly therefrom.

5. The tie-down assembly for a truck bed of claim 1 wherein the clamp has upwardly extending and spaced apart legs positioned in opposition to a mount flange for clamping a horizontal portion of a sidewall of the truck bed between the mount flange and the clamp legs when the fastener is tightened in the fastener receiver.

6. The tie-down assembly for a truck bed of claim 1 wherein the bottom surface has a formation of four spaced apart downwardly extending bosses formed thereon for providing improved stability to the assembly.

7. The tie-down assembly for a truck bed of claim 6 wherein the body defines a pair of spaced apart mounting holes therethrough, said mounting holes centered on a laterally spaced apart pair of the bosses, whereby improved lateral stability is provided to the assembly.

8. The tie-down assembly for a truck bed of claim 7 wherein a fastener is engaged within each one of the mounting holes for sharing lateral loads on the open ring formation for providing improved resistance to lateral forces on the assembly.

* * * * *